United States Patent [19]

Sehm

[11] 4,419,502
[45] Dec. 6, 1983

[54] POLYMERIZATION PROCESS FOR CARBOXYL CONTAINING POLYMERS
[75] Inventor: Eugene J. Sehm, Akron, Ohio
[73] Assignee: The B. F. Goodrich Company, Akron, Ohio
[21] Appl. No.: 427,323
[22] Filed: Sep. 29, 1982
[51] Int. Cl.$^3$ ............................................. C08F 2/08
[52] U.S. Cl. .................................. 526/209; 526/317
[58] Field of Search .................................. 526/209, 206
[56] References Cited
U.S. PATENT DOCUMENTS

| | | | |
|---|---|---|---|
| 3,251,816 | 5/1966 | Furerdel et al. | 526/209 |
| 3,407,246 | 10/1968 | Harris | 526/209 |
| 4,039,475 | 8/1977 | Oosterwijk | 526/209 |
| 4,062,817 | 12/1977 | Westerman | 526/206 |
| 4,229,547 | 10/1980 | Cohen | 526/209 |

FOREIGN PATENT DOCUMENTS

WO81/03333  11/1981  PCT Int'l Appl. ............... 526/209

Primary Examiner—Joseph L. Schofer
Assistant Examiner—Peter F. Kulkosky
Attorney, Agent, or Firm—J. Hughes Powell, Jr.

[57] ABSTRACT

A method for polymerizing olefinically unsaturated carboxylic acids containing at least one activated carbon-to-carbon olefinic double bond and at least one carboxyl group in methylene chloride, in the presence of a free radical forming catalyst and a polyoxyethylene alkyl ether and/or a polyoxyethylene sorbitol ester surface active agent having an HLB value in the range of greater than 12.

10 Claims, No Drawings

POLYMERIZATION PROCESS FOR CARBOXYL CONTAINING POLYMERS

BACKGROUND OF THE INVENTION

Water sensitive carboxyl containing homopolymers or copolymers of unsaturated polymerizable carboxylic acids such as acrylic acid, methacrylic acid, maleic acid, itaconic acid and the like, with other vinylidene monomers are known. These materials are normally prepared by polymerization with a free radical catalyst in an organic medium such as benzene in a stirred vessel. During the course of such polymerizations, shortly after the initiation of polymerization, polymer beings to precipitate from the solution as it is formed and flocculates and forms aggregates. The precipitated polymer forms a slurry in the solvent which often becomes extremely thick, resulting in ineffective mixing, heat build-up and fouling on reactor surfaces by polymer build-up. A further problem is that the solvent is trapped in the polymers during aggregation and removal of such trapped solvents as benzenes is time consuming and difficult. An improved solvent polymerization system is desired.

SUMMARY OF THE INVENTION

An improved process for preparing carboxyl containing polymers from vinylidene monomers is realized when such polymerizations are conducted in methylene chloride in the presence of polyoxyethylene alkyl ether and/or polyoxyethylene sorbitol ester surface active agents having HLB values greater than 12. Using this polymerization system, polymer slurry is improved, particularly in large scale equipment, the particle size of the precipitated polymer is controlled, better mixing and heat transfer is obtained, and polymer build-up is reduced.

DETAILED DESCRIPTION

The carboxyl containing polymers are prepared from vinylidene monomers containing at least one terminal $CH_2<$ group. Such polymers may be homopolymers or copolymers of an unsaturated, polymerizable carboxylic monomers such as acrylic acid, methacrylic acid, maleic acid, itaconic acid and the like, or copolymers thereof. Typical materials are those described in U.S. Pat. No. 2,708,053. Copolymers, for example, include copolymers of acrylic acid with small amounts of polyalkyenyl polyether cross-linkers that are gel-like polymers, which, especially in the form of their salts, absorb large quantities of water or solvents with subsequent substantial increase in volume. Other useful carboxyl containing polymers are described in U.S. Pat. No. 3,940,351, directed to polymers of unsaturated carboxylic acid and at least one alkyl acrylic or methacrylic ester where the alkyl group contains 10 to 30 carbon atoms. Other types of such copolymers are described in U.S. Pat. No. 4,062,817 wherein the polymers described in 3,940,351 contain additionally another alkyl acrylic or methacrylic ester and the alkyl groups contain 1 to 8 carbon atoms.

The carboxyl containing polymers have molecular weights greater than about 500 to as high as several million, usually greater than about 10,000 to 900,000 or more. Carboxylic polymers and copolymers such as those of acrylic acid, methacrylic acid, maleic acid, or the anhydrides thereof also may be crosslinked with polyfunctional materials as divinyl benzene, unsaturated diesters and the like, as is disclosed in U.S. Pat. Nos. 2,340,110; 2,340,111 and 2,533,635.

The carboxylic monomers useful in the production of polymers of this invention are the olefinically-unsaturated carboxylic acids containing at least one activated carbon-to-carbon olefinic double bond, and at least carboxyl group; that is, an acid containing an olefinic double bond which readily functions in polymerization because of its presence in the monomer molecule, either in the alpha-beta position with respect to a carboxyl group, $—C=C—COOH$; or as a part of a terminal methylene grouping $CH_2=C<$. Olefinically-unsaturated acids of this class include such materials as the acrylic acids typified by the acrylic acid itself, methacrylic acid, ethacrylic acid, alpha-chloro-acrylic acid, alpha-cyano acrylic acid, beta methylacrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acid (1-carboxy-4-phenyl butadiene-1,3), itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure

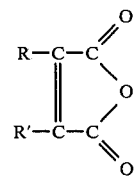

wherein R and R' are selected from the group consisting of hydrogen, halogen and cyanogen ($—C≡N$) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers for use in this invention are the monoolefinic acrylic acids having the general structure

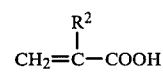

wherein $R^2$ is a substituent selected from the class consisting of hydrogen, halogen, and the cyanogen ($—C≡N$) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred. Another useful carboxylic monomer is maleic anhydride or the acid.

The polymers contemplated include both homopolymers of carboxylic acids or anhydrides thereof, or the defined carboxylic acids copolymerized with one or more other vinylidene monomers containing at least one terminal $CH_2<$ group. Such materials include, for example, acrylate ester monomers including those acrylic acid ester monomers such as derivatives of an acrylic acid represented by the formula

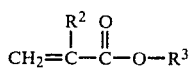

wherein $R^3$ is an alkyl group having from 1 to 30 carbon atoms, preferably 1 to 20 carbon atoms and $R^2$ is hydrogen, methyl or ethyl, present in the copolymer in amount, for example, from about 1 to 40 weight percent or more.

Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, and the like; higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers. One useful class of copolymers are methacrylates where the alkyl group contains 16 to 21 carbon atoms. Typical polymers have been with 10 to 20 weight percent isodecyl methacrylate, 5 to 15 weight percent lauryl methacrylate, 2 to 10 weight percent stearyl methacrylate, with acrylic acid. Mixtures of these two classes of acrylates provide useful copolymers.

The polymers also may be cross-linked with any polyfunctional vinylidene monomer containing at least 2 terminal $CH_2<$ groups, including for example, butadiene, isoprene, divinyl benzene, divinyl naphthalene, allyl acrylates and the like. Particularly usedful cross-linking monomers for use in preparing the copolymers, if one is employed, are polyalkenyl polyethers having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 4 carbon atoms and at least 2 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers includes for example, diallyl esters, dimethallyl ethers, allyl or methallyl acrylates and acrylamides, tetraallyl tin, tetravinyl silane, polyalkenyl methanes, diacrylates, and dimethacrylates, divinyl compounds such as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, ethylene diacrylate, ethylene dimethacrylate, triethylene glycol dimethacrylate, and the like. Allyl pentaerythritol, trimethylolpropane diallylether and allyl sucrose provide excellent polymers.

When the optional cross-linking agent is present, the polymeric mixtures usually contain up to about 5% or more by weight of cross-linking monomer based on the total of carboxylic acid monomer, plus other monomers, if present and more preferably about 0.1 to 2.0 weight percent.

Other vinylidene monomers may also be used, particularly in conjunction with the acrylic acid esters, including the acrylic nitriles, $\alpha,\beta$-olefinically unsaturated nitriles useful are preferably the monoolefinically unsaturated nitriles having from 3 to 10 carbon atoms such as acrylonitrile, methacrylonitrile, ethacrylonitrile, chloroacrylonitrile, and the like. Most preferred are acrylonitrile and methacrylonitrile. The amounts used are, for example, for some polymers are from about 5 to 30 weight percent of the total monomers copolymerized. Acrylic amides include monoolefinically unsaturated amides also may be used. These have at least one hydrogen on the amide nitrogen and the olefinic unsaturation is alpha-beta to the carbonyl group. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide used in amounts, for example, from about 1 to 30 weight percent of the total monomers copolymerized. Other acrylic amides include N-alkylol amides of alpha, betaolefinically unsaturated carboxylic acids including those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts for example of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meanings. The preferred alkoxymethyl acrylamides are those wherein the alkyl group containing from 2 to 5 carbon atoms, as N-butoxymethyl acrylamide.

Other useful vinylidene comonomers generally include, in addition to those described above, at least one other olefinically unsaturated monomer, more preferably at least one other vinylidene monomer (i.e., a monomer containing at least one terminal $CH_2=CH<$ group per molecule) copolymerized, for example, in amounts of up to about 30 percent or more by weight of the total monomers. Suitable comonomers include $\alpha$-olefins containing from 2 to 12 carbon atoms, more preferably from 2 to 8 carbon atoms; dienes containing from 4 to 10 carbon atoms; vinyl esters and allyl esters such as vinyl acetate; vinyl aromatics such as styrene, methyl styrene, cholorstyrene; vinyl and allyl ethers and ketones such as vinyl methyl ether and methyl vinyl ketone; chloroacrylates, cyanoalkyl acrylates such as $\alpha$-cyanomethyl acrylate, the $\alpha$-, $\beta$- and $\gamma$-cyanopropyl acrylate; alkoxyacrylates such as methoxy ethyl acrylate; haloacrylates as chloroethyl acrylate; vinyl halides and vinyl chloride, vinylidene chloride and the like; vinyl benzyl chlorides; esters of maleic and fumaric acid and the like; divinyls, diacrylates and other polyfunctional monomers such as divinyl ether, diethylene glycol diacrylate, ethylene glycol dimethacrylate, methylene-bis-acrylamide, allylpentaerythritol, and the like; and bis(β-haloalkyl) alkenyl phosphonates such as bis(β-chloroethyl) vinyl phosphonate and the like as are known to those skilled in the art. Copolymers wherein the carboxy containing monomer is a minor constituent, and the other vinylidene monomers are present on major components are readily prepared in accordance with the process of this invention.

These copolymers may include as little as 8 weight percent of the total polymer of a carboxyl containing monomer, up to 100 percent, i.e. homopolymer. Particularly useful copolymers contain greater than 40 percent acid and preferably greater than 70 weight percent acid.

Polymerization of the monomers in the methylene chloride is usually carried out in the presence of a free radical catalyst in a closed vessel in an inert atmosphere under autogenous pressure or artificially-induced pressure, or in an open vessel in an inert atmosphere under reflux at atmospheric pressure. Temperature of the polymerization may be varied from about 0° to 125° C. or lower or higher. Polymerization at 25° to 90° C. using a free radical catalyst is generally effective in producing polymer yields of 75 percent to 100 percent. Typical free radical forming catalysts include peroxygen compounds such as sodium, potassium and ammonium persulfates, caprylyl peroxide, benzoyl peroxide, hydrogen peroxide, pelargonyl peroxide, cumene hydroperioxides, tertiary butyl diperphthalate, tertiary butyl perbenzoate, sodium peracetate, sodium (2-ethylhexyl)percarbonate, and the like, as well as azo catalysts such as azodiisobutyryl nitrile. Other catalysts utilizable are the so-called "redox" type of catalyst and the heavy-metal activated catalyst systems. Ultra-violet light may also be used as a source of free radicals. Some systems polymerize solely by heat, but catalysts provide better control. The monomer may be batch charged or continuously added during the course of polymerization or by any other manner of polymerization techniques conventionally used.

The amount of methylene chloride used normally will be in excess of the monomers to be polymerized and the proportion may vary from at least 1 weight percent of monomers and 99 percent of methylene chloride up to about 50 weight percent monomers and 50 weight percent methylene chloride, more normally a concentration of about 5 to 30 weight percent organic monomers is employed.

The improvement of the present invention is in the use of the combination of the defined surfactants with methylene chloride. The surfactant's emulsifying efficiency is related to the polarity of the molecule, that is, the relation between the contribution of the polar hydrophilic head and the nonpolar lipophilic tail. This polarity is defined in terms of an empirical quantity which is called the hydrophile-lipophile balance of HLB. The HLB is explained and the method of determining the same is set out in "Nonionic Surfactants" edited by Martin J. Shick at page 604–612, published in 1967 by Marcel Dekker, Inc., New York. For the purposes of the present invention, surfactants having an HLB in the range of greater than about 12, preferably to about 18 are satisfactory. Mixtures of these surfactants can also be used. Usually the amount of surfactant employed may be in the range of about 0.1 percent to about 15 percent by weight, based on the weight of the monomer or monomers to be polymerized. Normally, an amount of surfactant in the range of about 1 to 8 percent, usually 2 to 5 percent by weight is employed.

As stated, the surface active agents used in conjunction with methylene chloride to provide the improved solvent system of this invention must have HLB values greater than 12, and more preferably from about 14 to 18. Two preferred groups of such surface active agents are polyoxyethylene alkyl ethers and polyoxyethylene sorbitol esters.

The polyoxyethylene alkyl ethers have the formula

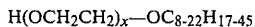

wherein x is a number from 18 to 28, more preferably, 20 to 25, and the alkyl groups contain 8 to 22 carbon atoms, more preferably, 10 to 18 carbon atoms, and are essentially linear alkyl radicals.

The polyoxyethylene sorbitans are well known under the Trademark "TWEEN" as commercial surface active agents. They are polyoxyethylene derivatives of fatty acid partial esters of sorbitol anhydrides. The anhydrides are the cyclic dehydration products of sorbitol, and are a mixture of tetrahydropyran and tetrahydrofuran. They may be represented by the general formula

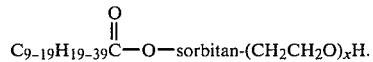

wherein x is a number from 18 to 28, more preferably 18 to 22, and the ester groups contain alkyl radicals containing from 9 to 19 carbon atoms, and are mono- or polyesters. The acid radical may contain from 8 to 22 carbon atoms.

Typical surface active agents that have HLB values greater than 12 and are defined by the above formula include: polyoxyethylene(23)lauryl ether, polyoxyethylene(20)cetyl ether, polyoxyethylene(20)stearyl ether, polyoxyethylene(25)lauryl ether, polyoxyethylene(20)sorbitan monostearate, polyoxyethylene(20)sorbitan monomyristate, polyoxyethylene(20)sorbitan monopalmitate, and the like.

In the practice of the invention, the polymerizations may be either batch, semi-batch or continuous. The agitation may be any agitation sufficient to maintain the slurry and obtain effective heat transfer including, for example, helical agitators, pitched turbines and the like. A useful reaction temperature range is from the range of 20° C. to 90° C. at about 1 atmosphere or more. Normal polymerization time is from about 5 to 12 hours.

To demonstrate the practice and advantages of the invention, several polymerizations are described in the following Examples. One of the objectives of the invention is an improved solvent system and resulting improvement in polymer slurry quality during and after the polymerization. There is no absolute way to measure slurry quality of these carboxylic acid polymerizations. Viscosity of the slurry during and at the end of the polymerization has been used with some success to indicate satisfactory or unsatisfactory slurries, but this value is often affected by other factors such as the type and degree of crosslinking of the polymer, the molecular weight, concentration of the polymer, the organic liquid used and the like.

An Index has been derived as a measure of Slurry Quality, particularly as it is affected by choice of surfactant in methylene chloride. The Index is based on the process variables, slurry viscosity, transferability of the slurry, and polymer build-up on reactor surfaces. The Index is made up of three observations: (A) the apparent slurry viscosity in the reactor during and after polymerization was complete, (B) the ease with which one could transfer the slurry to a receiver under vacuum through a standard transfer tube (ca. 6 mm, I.D.); and (C) the level of hard build-up on the reactor walls. The build-up did not change much in Examples using the process of this invention, so therefore the Index is essentially derived from (A) and (B). Arbitrary values were assigned as follows:

| A Slurry Viscosity | | B Transferability | | C Build-Up | |
|---|---|---|---|---|---|
| Very fluid | 1 | Easy | 1 | Minimal | 1 |
| Fluid | 2 | Difficult | 2 | Normal | 2 |
| Viscous | 3 | Must dilute to transfer | 3 | Excessive | 3 |
| Thick paste | 4 | | | Extreme | 4 |

These number values are assigned on observation of the slurries of each of the polymerizations and the Index is obtained according to the formula, $A \times B \times C =$ Quality Index. As a guide, lower numbers are desired. At 11 percent polymer total solids, an Index above 8 may not be useful. At a polymer total solids of about 15 percent, a slurry quality Index above about 16 would be difficult to handle in large equipment. As will be shown in the Examples, the concentration of surfactant, as well as the type have an effect on the Index, and while a defined surfactant in accordance with this invention may provide a higher Index at low concentrations, at higher concentrations, it may provide a very low Index. Polymer slurries as high as about 25 weight percent have been obtained in accordance with the process of this invention.

EXAMPLE I

A mixture of 514.8 weight parts of methylene chloride, 26.5 weight parts of acrylic acid, 0.5 weight parts of trimethylolpropane diallyl ether and 1.1 weight parts of polyoxyethylene(23)lauryl ether (HLB 16.9) was charged to a stirred reactor, heated to reflux under nitrogen to about 40° C. Then 0.8 weight parts of di(2-ethylhexyl)peroxy dicarbonate peroxide was injected into the reactor and the mixture was maintained at 40° C. After about 20 minutes, a mixture of 128 weight parts of methylene chloride, 86 weight parts of acrylic acid, 1.8 weight parts of trimethylolpropane diallyl ether and 3.5 weight parts of polyoxyethylene(23)lauryl ether was metered into the reactor over a 4 hour period. Heating was continued for 2 hours after the metering was completed. The slurry viscosity during the course of the polymerization was low and substantially free of agglomerates and the Quality Index of the resulting slurry was 3. The polymer slurry was filtered and the polymer dried under vacuum and heat, 95° C. and 700 mm Hg. 97 weight parts of polymer was obtained. 0.2, 0.5 and 1.0 weight percent mucilages in water were prepared, the pH of the mucilages are adjusted to 7.2 with a NaOH solution and the viscosity of each determined by the Brookfield Viscometer at 20 rpm. The values obtained were 17,000; 47,000; and 58,000 centipoises.

When this Example was repeated with sorbitan polyoxyethylene(20)monostearate (HLB 14.9), similar satisfactory results were obtained with a Slurry Quality Index of 6. When polyoxyethylene(15)stearyl-cetyl ether (HLB 16.9) was tested, it was found to be unsatisfactory with poor slurry properties and a Slurry Quality Index of 24. When polyoxyethylene(30)stearyl-cetyl ether (HLB 16.7) was tested in a similar polymerization reaction, it was also found to be unsatisfactory with poor slurry properties and a Quality Index of 24, even at a total solids content of only 11 percent. Both of these reactions also demonstrate the criticality of the polyoxyethylene content of the surface active agent molecule that must have an n value between 18 and 28, even when the HLB value of the surfactant is greater than 12.

EXAMPLE II 514.8 weight parts of methylene chloride was charged to a reactor. 42 weight parts of a mixture of 162.7 weight parts of methylene chloride, 114.5 weight parts of acrylic acid, 1.8 weight parts of trimethylol propane diallyl ether and 3.4 weight parts of polyoxyethylene(23)lauryl ether was added to the reactor and the mixture was heated to reflux under nitrogen. 0.8 weight part of di(2-ethylhexylperoxydicarbonate peroxide was injected, and after 30 minutes, the remainder of the acrylic acid mixture was metered into the reactor over a 3 hour period. The reaction was continued for 2 hours until greater than 99.5 weight percent of the monomers was converted to polymer. The polymer slurry was satisfactory during the polymerization and when the polymerization was completed, having a Quality Index of 6.

These Examples clearly set forth the improvement and advantages obtained when the polymerization are conducted with the defined dispersants having HLB values of greater than 12 in methylene chloride, whereby improved slurry quality of carboxyl containing polymers during and after polymerization is obtained.

I claim:

1. A method comprising polymerizing olefinically unsaturated carboxylic acids containing at least one activated carbon-to-carbon olefinic double bond and at least one carboxyl group in a polymerization media consisting essentially of methylene chloride in the presence of a free radical forming catalyst and a surface active agent having an HLB value greater than 12 selected from the group consisting of sorbitan polyoxyethylene(n)monoesters and polyoxy ethylene(n)alkyl ethers wherein n is a number from 18 to 28 and the acid radical of the ester and the alkyl group of the ether containing from 8 to 22 carbon atoms.

2. A method of claim 1 wherein in said carboxylic acid, the olefinic double bond is in the alpha-beta position with respect to a carboxyl group or is part of a terminal methylene group, the HLB value is 14 to 18, n is a number between 20 to 25, and the acid radical and alkyl group are alkyl radicals containing from 10 to 18 carbon atoms.

3. A method of claim 2 wherein said carboxylic acid is selected from the group consisting of acrylic acid, methacrylic acid, and maleic acid.

4. A method of claim 3 wherein said carboxylic acid is acrylic acid present in amounts of greater than 40 weight percent and from 0 to 60 weight percent of at least one other vinylidene monomer containing at least one CH$_2$=CH< group copolymerized witherewith.

5. A method of claim 4 wherein said acrylic acid is present in amounts greater than 70 weight percent and there is present less than 5 weight percent of a polyfunctional crosslinking vinylidene monomer containing at least two terminal CH$_2$< groups.

6. A method of claim 5 wherein said cross-linking agent is selected from the group consisting of allyl pentearythritol, allyl sucrose and trimethylolpropane diallylether.

7. A method of claim 6 wherein said surface active agent is present in amount of about 1 to about 8 percent by weight.

8. A method of claim 7 wherein there is present less than 30 weight percent of an acrylic acid ester of the formula

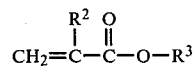

wherein $R^2$ is hydrogen, methyl or ethyl and $R^3$ is an alkyl group containing 1 to 30 carbon atoms and the surface active agent is selected from the group consisting of polyoxyethylene lauryl, cetyl or stearyl ether and mixtures thereof.

9. A method of claim 8 wherein there is present less than 30 weight percent of an acrylic acid ester of the formula

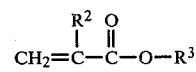

wherein $R^2$ is hydrogen, methyl or ethyl and $R^3$ is an alkyl group containing 1 to 30 carbon atoms, and the surface active agent is sorbitan polyoxyethylene(20-)monostearate.

10. A method of claim 9 wherein $R^2$ is hydrogen or methyl and $R^3$ is an alkyl group containing 2 to 20 carbon atoms.

* * * * *